United States Patent Office 2,762,825
Patented Sept. 11, 1956

2,762,825

PRODUCTION OF SUBSTITUTED SILANES BY THE GRIGNARD REACTION WITH HALOGEN-FREE DI-SILANES AND SILICON HYDRIDES

Hans Wilhelm Kautsky and Doris Siebel, Marburg, Lahn, Germany

No Drawing. Application February 3, 1953, Serial No. 334,984

Claims priority, application Germany February 4, 1952

5 Claims. (Cl. 260—448.2)

This invention relates to improvements in the production of silicon compounds. It more particularly relates to improvements in the production of alkylated or arylated silanes and their derivatives.

Alkylated silanes, arylated silanes, and their derivatives, as, for example, phenylated disiloxanes of oxysilanes have been prepared from completely halogenated silanes with the use of Grignard reagents. In addition, silicochloroform has also been used for this reaction in accordance with the following equation:

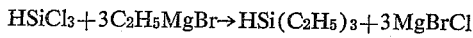

$$HSiCl_3 + 3C_2H_5MgBr \rightarrow HSi(C_2H_5)_3 + 3MgBrCl$$

These conventional methods have a decided disadvantage in that an end product which is entirely free of halogen can only be obtained with great difficulty by very cumbersome methods of operation. Although this preparation of an entirely halogen-free product is possible in the laboratory, it is not possible in practical operation. In addition, it was discovered, that when effecting the conversion of silicochloroform, the Si—H bond did not react.

One object of this invention is the preparation of alkylated silanes, arylated silanes and their derivatives, as, for example, siloxanes, from starting silicon compounds which are free of a reactive halogen. This and still other objects will become apparent from the following description:

It has now surprisingly and unexpectedly been found in accordance with the invention that the Grignard reactions may be effected in the absence of a reactive halogen atom. In accordance with the invention, a silicon compound which does not contain any reactive halogen and preferably contains no halogen at all and contains at least one Si—H and/or Si—Si bond is reacted in liquid or solid phase with a Grignard reagent. By means of the new reaction alkylated or arylated silanes or their derivatives, such as, for example, siloxanes, may be obtained. The reaction with the Grignard reagent should be carried out in liquid or solid phase and possibly at elevated temperatures.

Though it is preferable to use a halogen-free silicon compound as the starting material, it is also possible, in accordance with the invention, to use a silicon compound which contains halogen which will not perceptibly react. An example of such a silicon compound is bromosiloxene. When used in the above reaction, a conversion of the Si—H and Si—Si bonds into Si—R bonds will be effected without the bromine perceptibly reacting.

The invention will be explained in detail with reference to siloxene, i. e., a silicon compound having Si—H, Si—Si and Si—O—Si bonds, and with ethyl-magnesium bromide in ethereal solution as the Grignard reagent.

The reaction may be effected without heating or at elevated temperatures. The invention is, however, not limited to these compounds and any other silicon compounds containing these bonds and possibly silicon compounds substituted by a non-reactive halogen may be used and will react in a similar manner. In the same manner any of the known Grignard reagents may be used, as, for example, phenyl-magnesium bromide.

In accordance with the invention, there may be obtained silicon compounds, which, depending on the starting material used, may contain oxygen-containing groups, as, for example, Si—O—Si, Si—OH or SiO MgBr groups which may in the conventional manner be converted into polysiloxanes and may be used industrially in the same manner and for the same purposes as ordinary silicones, as, for example, as resins, oils or elastic materials. In addition, these compounds may be used to advantage to render surfaces water-repellant, as, for example, glass surfaces or even fabrics. In accordance with the invention, it is possible to use easily accessible starting materials and to obtain halogen-free products which are excellently suited for the above-mentioned purposes.

The invention constitutes an essential advancement in the art, since it is no longer necessary to halogenize sensitive substances into which it is desired to introduce, for example, alkyl or aryl groups. The halogenation conventionally required always entailed the risk of an undesirable change of the molecule. In accordance with the invention, the desired groups may be introduced into the molecule without changing its structure and merely by replacing the Si—H and/or Si—Si bond with an Si—C bond.

A further advantage of the invention resides in the fact that the usefulness of the Grignard reaction may be extended to silicon compounds which up to the present could not be used as starting products for this reaction, as, for example, the hydrolysis products of silicides and/or their oxidation products.

The method in accordance with the invention may, for example, be effected by adding an ethereal Grignard solution to a suspension of siloxene in ether. The mixture is then thoroughly mixed and a compound is formed which is soluble in ether and which may be recovered by the evaporation of the ether. A high-boiling liquid is obtained in this reaction. In accordance with this method of operation, the yield of the silicanes is relatively small, since it has been found that the main portion of the ethyl-magnesium bromide is held firmly bound to the boundary surfaces of the siloxene without reacting. If, however, after the ether has been removed the reaction mass obtained is heated in dry condition for relatively long periods of time, at, for example, 140° C., the yield of liquid silicanes is considerably increased. The extraction of the reaction products from the solid mass by means of, for example, ether or benzene, allows the recovery of compounds such as

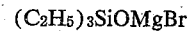

$$(C_2H_5)_3SiOMgBr$$

and

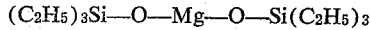

$$(C_2H_5)_3Si-O-Mg-O-Si(C_2H_5)_3$$

which are soluble in the solvent and will hydrolyze with, for example, dilute hydrochloric acid to form triethyloxysilane which condenses further to form hexaethyldisiloxane, splitting off water. The reactions indicate that both the Si—H and the Si—Si bonds react with the formation of Si—C bonds. These reactions probably proceed as follows:

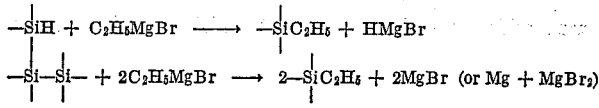

$$-\underset{|}{Si}H + C_2H_5MgBr \longrightarrow -\underset{|}{Si}C_2H_5 + HMgBr$$

$$-\underset{|}{Si}-\underset{|}{Si}- + 2C_2H_5MgBr \longrightarrow 2-\underset{|}{Si}C_2H_5 + 2MgBr \text{ (or } Mg + MgBr_2)$$

Thus, there may be produced extremely reactive magnesium compounds, such as HMgBr, which may be used for further reactions, as, for example, reducing and hydrogenating agents.

The following examples are given by way of illustration and not limitation:

*Example 1*

To a suspension of 40 grams siloxene in ether there was added gradually in a Fritten apparatus a Grignard reagent which was formed by reacting in ether 220 grams ethyl bromide and 50 grams magnesium. Due to the sensitivity of the siloxene to moisture and oxygen, the operation is effected in a stream of nitrogen. After each addition of the Grignard reagent, the content of the apparatus was thoroughly stirred by means of the nitrogen current, and, after the termination of the reaction, the ethereal solution of the reaction product was filtered off. After the addition of dilute hydrochloric acid and evaporation of the ether, the oil product could be obtained.

*Example 2*

To 40 grams of siloxene there was added a Grignard reagent which was formed by reacting in ether 75 grams magnesium and 340 grams ethyl bromide, and the ether was removed by distillation. The dry reaction residue was heated for four hours at 140–145° C. After treatment in accordance with Example 1, there were obtained 20 grams of a liquid substance.

*Example 3*

To 190 grams siloxene there was added a Grignard reagent which was formed by reacting in ether 240 grams magnesium and 1090 grams ethyl bromide. The heating of the reaction mixture took place in an oil bath after the ether had been distilled off. The temperature of the bath was slowly increased to 140° C. and maintained for a few hours between 140 and 145° C. At 125–130° C. there took place a gradually increasing brown discoloration of the dry mixture. The solid reaction mixture was extracted with hot benzene. The addition of dilute hydrochloric acid effected the splitting of the SiOMgBr produced and effected the dissolving of magnesium salts present in the extract. After the benzene had been evaporated off on a water bath, there remained a liquid residue of 150 grams. This liquid was separated into four fractions by distillation in vacuum. The following table gives a summary of the distillation pressure and temperature, as well as the weights of the substances obtained.

| Fraction | Yield in Grams | B. P. in ° C. | Pressure in mm. Hg |
| --- | --- | --- | --- |
| I | 65 | 60–65 | 17–18 |
| II | 54 | 110–115 | 16–17 |
| III | 13 | 150–155 | 16–17 |
| IV | 18 | undistilled | |

It has not yet been possible to identify fractions III and IV.

It was merely determined that there were concerned silicanes having a silicon content of 20%. These substances contain oil, and, upon being exposed to the air, become viscous or solid. In fraction I there is present the compound triethylsilanol, and in fraction II the compound hexaethyldisiloxane, which is produced by condensation from the compound contained in fraction I.

*Example 4*

To 190 grams siloxene in a round bottom flask there was added a Grignard reagent which was formed by reacting in ether 400 grams magnesium and 1800 grams ethyl bromide. The evaporation of the ether was effected first of all on a water bath at ordinary pressure, and finally in a vacuum produced by an oil pump. After the ether had been removed, the reaction flask was slowly brought to a temperature of 140° C. (on an oil bath) with simultaneous cooling of the trap located in front thereof with a carbon dioxide-acetone freezing mixture. At a temperature of the oil bath of about 130° C. there occurred also in this case a brown coloration of the solid reaction mass. The solid reaction mass was extracted with the benzene and, after the addition of acid, separation of the benzene layer and distillation of the benzene, 148 grams of liquid silicanes were obtained from the solution. From this mixture it was possible by distillation in vacuum to obtain four fractions of the same boiling points as in Example 3.

| Fraction | Yield in Grams | B. P. in ° C. | Pressure in mm. Hg |
| --- | --- | --- | --- |
| I | 54 | 62–67 | 19–20 |
| II | 39 | 108–115 | 18–19 |
| III | 29 | 150–155 | 17–18 |
| IV | 25 | undistilled | |

The same products as in Example 3 were obtained.

We claim:

1. Method for the preparation of alkylated and arylated silanes and siloxanes, which comprises contacting a substantially-reactive halogen-free silicon compound selected from the group consisting of silicon oxyhydrides containing an Si–H bond and silicon oxyhydrides containing an Si–Si bond with a Grignard reagent selected from the group consisting of aryl and alkyl Grignards, in a phase ranging from liquid to solid phase, whereby the Grignard reagent reacts with said bonds, and recovering the silicon reaction product formed.

2. Method according to claim 1, in which said Grignard reagent is ethyl magnesium bromide.

3. Method according to claim 1, in which said silicon compound is siloxene in the form of an ethereal suspension, and which includes separating the silicane produced from the ether suspension, heating the reaction residue and thereafter recovering silicon-reaction products therefrom by extraction.

4. Method according to claim 3, in which magnesium-free silicanes are recovered from the extracted silicon compounds by the addition of dilute acid.

5. Method according to claim 1, in which said contacting is effected at elevated temperatures.

References Cited in the file of this patent

UNITED STATES PATENTS

| | | |
| --- | --- | --- |
| 2,380,057 | McGregor | July 10, 1945 |
| 2,406,971 | Sowa | Sept. 3, 1946 |
| 2,444,784 | Meals | July 6, 1948 |
| 2,698,334 | Rust et al. | Dec. 28, 1954 |

OTHER REFERENCES

Ephraim: "Inorganic Chemistry," 5th English edition (1949) pp. 848–850. Interscience Publishers, N. Y.

Benkeser et al.: "Jour. Am. Chem. Soc.," vol. 74 (1952) pp. 4200–4201.

Kharasch et al.: Grignard Reactions of Nonmetallic Substances," (1954), pp. 1166–1171, Prentice-Hall, publisher, N. Y.